July 28, 1964     A. RAZDOW     3,142,176
MEASUREMENT OF THRUST

Filed July 8, 1960     3 Sheets—Sheet 1

INVENTOR
ADOLPH RAZDOW
BY *Harry G. Shapiro*
ATTORNEY

July 28, 1964          A. RAZDOW          3,142,176
MEASUREMENT OF THRUST
Filed July 8, 1960                              3 Sheets-Sheet 2
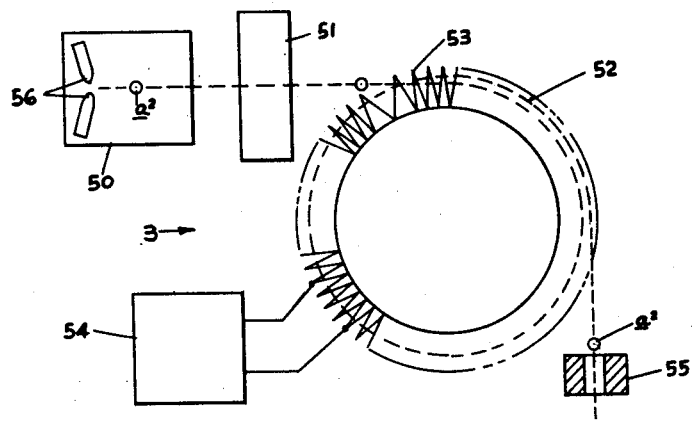
FIG.5
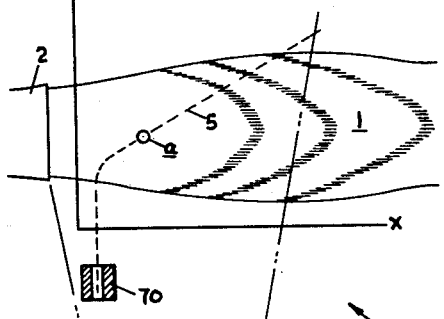
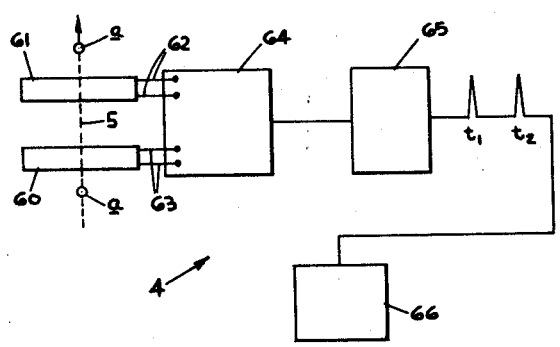
FIG.7          FIG.6
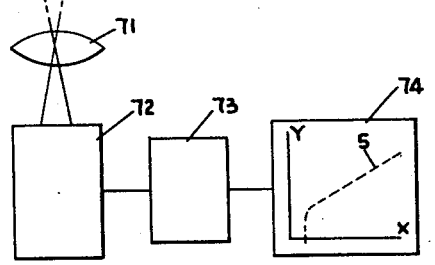
INVENTOR
ADOLPH RAZDOW
BY *Harry G. Shapiro*
ATTORNEY July 28, 1964     A. RAZDOW     3,142,176
MEASUREMENT OF THRUST Filed July 8, 1960     3 Sheets-Sheet 3

INVENTOR
ADOLPH RAZDOW

BY *Harry G. Shapiro*
ATTORNEY

United States Patent Office 3,142,176
Patented July 28, 1964

3,142,176
MEASUREMENT OF THRUST
Adolph Razdow, Montclair, N.J., assignor to Razdow Laboratories, Inc., Newark, N.J., a corporation of New Jersey
Filed July 8, 1960, Ser. No. 41,622
20 Claims. (Cl. 73—116)

The invention relates to methods and apparatus for determining the thrust characteristics of a rapidly moving stream of high temperature gases, and is more particularly directed to measuring the thrust and determining the location of the resultant thrust vector of a reaction engine, such as a jet or rocket engine.

The thrust efficiency of a rocket or jet engine depends upon the flow and dynamic behavior and kinetic energy of the gas particles emitted from the exhaust nozzle. It is important that the total resultant thrust vector coincide with the central longitudinal axis of the exhaust nozzle. If not in coincidence, the engine is in imbalance, and appropriate corrections must be made.

It has been proposed to ascertain the position of the resultant thrust vector by inserting measuring instruments within the exhaust stream at various points along its cross-section. Such procedure has several limitations. The exhaust stream comprises a highly corrosive mixture of high temperature products of combustion traveling at great speed. Available instruments, when inserted into the exhaust stream, soon deteriorate and become inoperative. Moreover, the presence of the instruments in the direct path of the exhaust stream causes turbulence, alters the flow and thrust pattern of the stream, and results in measurements which are inaccurate.

It has been proposed to determine the velocity of the exhaust stream of a jet engine or the like by adding to the stream for flow therewith, a powdered material which is made incandescent by the high temperature products of combustion. A recording camera is used to determine the time which the entrained, incandescent particles traverse a measured path along the length of the stream. This technique relies upon the assumption that the entrained particles will possess the same velocity as the velocity of the burning exhaust gases, an assumption which is far from certain. Moreover, this technique and others, which are limited to the measurement of the velocity of the exhaust stream as a whole or average velocity, are of no assistance in the determination of the position of the resultant thrust vector.

In accordance with the invention, a small particle or particles of metal or other suitable material is injected into the exhaust stream of rapidly moving, high temperature gases in a direction substantially transversely of the direction of the stream's flow. The mass and the velocity of the particle injected into the exhaust stream are predetermined and known prior to injection into the stream. The injected particle is deflected by the rapidly moving stream of exhaust gases. The velocity imparted to the particle as it is injected into the stream is made sufficiently great to cause the particle to pass through the stream though deflected thereby, rather than carried off with the stream. The degree of deflection depends upon the incremental thrusts exerted on the particle by the exhaust gases as the particle passes across the stream. By measuring the magnitude of deflection, and with the mass and entrance velocity of the particle known, the desired thrust information may be readily observed and computed.

An object of the invention is to provide a procedure for determining the thrust characteristics or pattern of a rocket or jet engine's exhaust stream, wherein the medium used to measure, test or monitor the stream constitutes small masses of expendible material which do not affect the stream's flow pattern, thereby simply and inexpensively affording accurate determination of the stream's exhaust characteristics.

Another object of the invention is to provide methods and means for accurately determining the location of the resultant thrust vector of a reaction type engine in a manner which does not interfere with or disturb the flow characteristics of the rapidly moving stream of high temperature gases.

These, and other objects and advantages of the invention will be apparent from the following detailed description of several preferred embodiments of the invention as shown in the accompanying drawings, in which:

FIG. 5 is a view of a third form of particle injecting means;

FIG. 6 is a view showing an arrangement for measuring the velocity of a particle about to enter the exhaust stream;

FIG. 7 is a view showing an arrangement for recording the trajectory of an injected particle;

Figure 1:
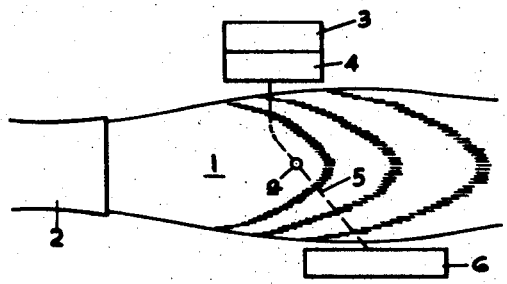
FIG. 1 is a diagrammatic showing of a thrust measuring system in accordance with the invention.

Referring to FIG. 1, a stream 1 of high temperature, rapidly moving exhaust gases issue from the nozzle 2 of a reaction engine, the thrust characteristics of which are to be determined. An injection device 3 is positioned adjacent the periphery of the exhaust stream to inject or fire suitable particles into the exhaust stream substantially transversely of the direction of the stream's flow. Preferably, the particles, designated $a$, are injected into the stream at a right angle thereto. The device 3 is designed to rapidly accelerate the particle to the desired firing speed as the particle is injected into the exhaust stream. Just before the particle enters the stream, it passes through velocity measuring means 4, where its speed upon entry into the stream is determined. The velocity imparted to the particle as it enters the exhaust stream is made sufficiently great so that the particle will pass through the stream. As the particle traverses the stream, it is deflected in accordance with the incremental thrusts exerted upon it by the different segments of the stream. The broken line 5 represents the path of an injected particle in its passage across the stream.

The degree of deflection imparted to the particle by the exhaust stream is determined in one of several ways. The particles may be of a material which will glow in response to the impact by and temperature imparted thereto by the exhaust gases, whereupon the trajectory of the particle or particles may be recorded by optical apparatus. Also, certain high frequency electrical phenomena occur during the transit of the particle through the exhaust stream, which phenomena may be used in conjunction with suitable sensing apparatus to determine the trajectory of the particle. Preferably, a suitable target is provided to cover an area where the particle may be generally expected to emerge from the exhaust stream, the target being of a nature that it will indicate the precise point at which it is struck by the particle. Means for measuring the deflection of a particle of known mass and velocity which has been injected into the stream is designated 6 in FIG. 1.

The particles to be injected into the exhaust stream may be any one of a number of suitable materials capable of withstanding, without undue deterioration, passage through the high temperature products of combustion constituting the exhaust gases. Also, the particles may be of a character to glow in the exhaust gases to permit tracing the trajectory by visual, optical, electro-optical or any other suitable recording means. Examples of materials which may be used for the particles are titanium, palladium, tellurium, osmium, iron, aluminum and magnesium. If desired, the particles may comprise a core of metal protected by an outer layer or coating of high temperature resistant ceramic material.

The size of the particles for injection into the exhaust stream may vary over a substantial range, it being significant, however, that its mass be known. Preferably, a particle size of between approximately 100 to 2,000 microns is used.

A suitable velocity for the particles as they are injected into the exhaust stream is on the order of magnitude generally approximating the average velocity of the exhaust stream being tested. At a jet velocity of 25,000 miles per hour, the speed of the exhaust gases is approximately $5 \times 10^5$ inch/second. If the particles are injected into the stream at such speed, the particle trajectory would follow an angle of approximately 45° for a certain distance, depending upon the density of the gases. Any change from such trajected path indicates variation of the flow characteristics and variation of thrust in a segment or segments of the exhaust stream. In accordance with the invention, it is significant that the entrance velocity of the injected particle be sufficient to enable it to cross or pass through the exhaust stream, though deflected thereby.

*Particle Injecting Means*

Illustrative embodiments of the means 3 for injecting the particles into the exhaust stream will now be described.

Figure 2:
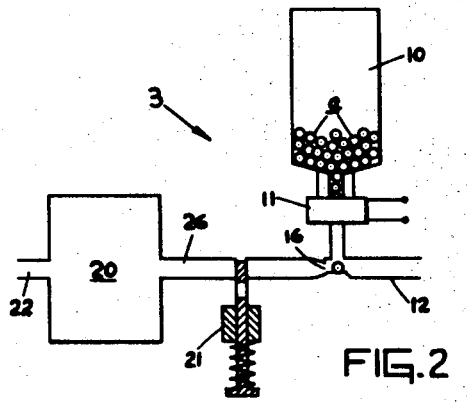
FIG. 2 is a view showing one form of particle injecting means.
Figure 3:
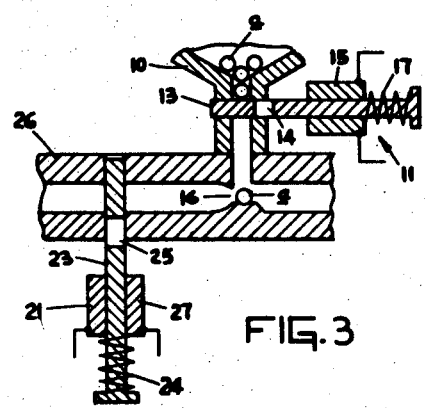
FIG. 3 is an enlarged cross-sectional view showing in detail a portion of the particle injecting means illustrated in FIG. 2.

One form of the injecting means is shown in FIGS. 2 and 3, such means including a container 10 for the particles a from which the latter are adapted to be fed one at a time under the control of an electromagnetically operated feed control valve 11 to a particle-dispensing nozzle 12. The mass of the individual particles a is substantially uniform and is determined, as by weighing, prior to their being loaded into container 10. As shown in FIG. 3, the core or plunger 13 of an electromagnet having an aperture 14, functions as a gate. The gate normally is in blocking position, as shown. In response to energization of the coil 15, the gate is shifted leftwardly to align the aperture 14 with the discharge opening of the container, whereby one of the particles a falls through the aperture and comes to rest seated in front of an orifice 16. The coil 15 is energized only long enough to allow one particle to leave container 10, and is then de-energized to permit a spring 17 to return the plunger gate 13 to blocking position.

A pressure vessel 20 containing a suitable gas, such as nitrogen or air, under high pressure communicates with orifice 16, which is under the control of an electromagnetic valve 21. The gas may be maintained under desired, selected pressure by a pump (not shown) connected to the pressure vessel by a pipe 22. The plunger or gate 23 of the solenoid type valve is normally held closed by a spring 24. The gate has an opening 25 therethrough, which is aligned with a conduit 26 leading from the pressure vessel 20, upon energization of the coil 27.

Through suitable cotrol means, automatic or manual, the coil 27 is energized to open the valve gate 23 after the feed control valve 11 has been operated to allow a particle a to descend into position in front of the orifice 16. Accordingly, the high pressure gas reaching the orifice from vessel 20 propels the particle out through nozzle 12 into the exhaust stream at a considerable velocity. Orifice 16 is so contoured to cause the propellant gas passing therethrough to expand, increase its velocity, and accelerate the movement of the particles injected into the exhaust stream.

Figure 4:
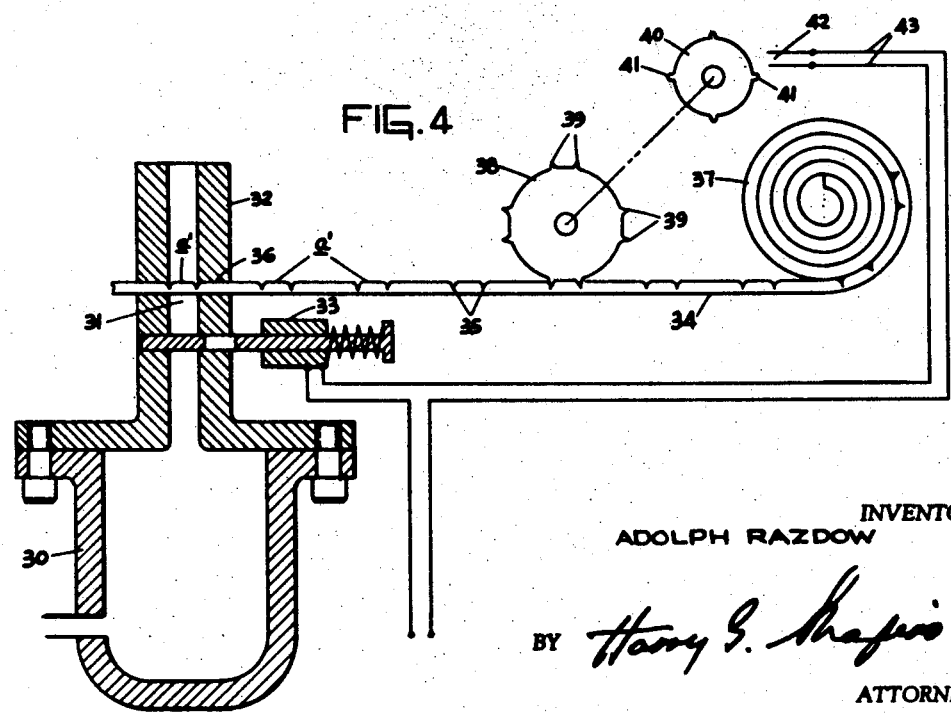
FIG. 4 is a view of another form of particle injecting means.

FIG. 4 shows another form of particle dispensing and injecting means. The particle propulsion mechanism of this form of the invention operates in substantially the same way as the propulsion system illustrated in FIGS. 2 and 3. The essential difference is the manner in which the particles are supplied for injection into the exhaust stream by the gas propellant. As shown, a high pressure vessel 30 communicates with an orifice 31 located rearwardly of the exit end of discharge nozzle 32. A normally closed electromagnetically operated valve 33, having an apertured plunger gate as previously described, will, when opened, allow gas to travel at high speed from the pressure vessel 30 to the orifice 31.

The particles to be fired into the exhaust stream are provided within a continuous, flexible, metal strip or band 34 of substantially uniform thickness to which the particles are separably connected. As shown in FIG. 4, the strip is embossed at equally spaced intervals to provide a longitudinal row of spaced particles $a'$ each connected to the strip by a circumscribing zone of weakness 35, where the thickness of the strip is reduced by the embossing. The strip is fed to pass in front of the orifice 31, a through slot 36 being provided in the discharge nozzle 32.

To facilitate handling, the embossed strip 34 is provided in the form of a supply roll 37. From this supply roll, the strip is advanced by a feeding device so that the strip will pass through the slot 36 and in front of the orifice 31. The feeding device comprises a wheel 38 having spaced pairs of teeth 39, the two teeth of each pair being spaced to be received in the zone of weakness 35 on each side of a particle. The spacing between successive pairs of teeth corresponds to the longitudinal spacing between particles formed for separation from the strip. Clockwise rotation of the wheel advances the strip. Under the control of suitable well-known mechanism (not shown), the feeding wheel 38 is indexed to position successive particles $a'$ at the orifice 31.

As each successive particle $a'$ is fed to position in front of orifice 31, the firing valve 33 is opened. The pressure of the gas propellant causes rupture at the zone of weakness 35 surrounding a particle, whereupon the particle is blown out of the discharge nozzle 32 and into the stream of exhaust gases. The mass of each particle is precalculated, and is, of course, a function of the dimensions of the particle, and the density of the material constituting strip 34.

To time the operation of the gas release valve 33 with the advance of the strip 34, a switch actuating wheel 40 is connected to and driven in synchronism with the strip feeding wheel 38. As the latter is rotated, spaced lobes 41 provided on wheel 40 cyclically close a switch 42 of an operating circuit 43 for the gas release valve. The lobes are spaced so that the circuit will be closed, to thereby open the valve and allow propellant gas to pass to the orifice 31 when a particle $a'$ is indexed to position in front of the orifice. The pulse to actuate the gas release valve may be used, together with the recording of the impact of the particle as it leaves the stream after traversing same, to record the time required for the particle to traverse the stream.

Another form of particle injecting means, wherein particles are accelerated electromagnetically, is illustrated in FIG. 5. From a particle source 50, the particles $a^2$, which are of magnetic material, are conducted through an electromagnetic field provided by a field winding type of accelerator 51 into the rotary field 52 provided by a series of annularly arranged coils 53 connected to and powered by a high frequency power oscillator 54. After a number of passes around the rotary field, the particles are accelerated sufficiently to be discharged through a nozzle 55, and into the stream of exhaust gases whose thrust characteristics are to be measured. The particle source 50 may comprise thin wires 56 of suitable material heated to a selected temperature to cause the wires to evaporate and furnish particles of desired size.

Measurement of Particle Entrance Velocity

The propulsion portion of the particle injecting means may afford sufficient uniformity and predictability within acceptable tolerances so that it is unnecessary to interpose means for measuring the velocity of the particles as they are injected into the exhaust stream. It is preferred, however, in the interest of accuracy and for a check upon the injecting means, to provide separate means for measuring the velocity of the particles upon their entry into the exhaust stream.

Various techniques may be employed to measure particle velocity at the measuring station 4 of FIG. 1. For example, the particle may traverse a zone defined by two sharply defined rays of radiant energy such as spaced beams of light or spaced electromagnetic or electrostatic fields. As shown in FIG. 6, a pair of spaced apart sensing devices 60 and 61, either of the photoelectric, electromagnetic or electrostatic type, are positioned along the path of travel of a particle just prior to entry into the exhaust stream. The electrical output on the respective, associated output lines 62 and 63 will be varied upon passage of the moving particle through each of the energy fields generated by the aforesaid sensing devices. The outputs of the sensing devices are fed to a modulator 64, and thence to a pulse amplifier 65. The passage of the particle through the respective fields of energy of the spaced sensing devices results in the amplifier providing two corresponding pulses, $t_1$ and $t_2$ spaced apart an amount which is proportional to the velocity of the particle. The pulses $t_1$ and $t_2$ are fed to a suitable electronic timer 66, which furnishes the elapsed time between the two pulses. The time interval between pulses can also be determined by an oscilloscope. Knowing the time elapsed between the pulses and the spacing between the energy fields of the sensing devices, the particle velocity may be readily computed. Means may be provided for direct read-out of time between pulses in terms of particle velocity.

Measurement of Particle Deflection

As previously indicated, a sampling particle $a$ fired at a high velocity into the exhaust stream substantially transversely of the longitudinal axis of the stream, will be deflected in the direction of the stream's flow in terms of the forces exerted upon the particle by the rapidly moving stream of exhaust gases. With the mass and entrance velocity of the particle known, the magnitude of deflection provides a measure of the thrust possessed by the jet or rocket engine. Also, the trajectory of the particle is indicative of thrust variation within the stream's cross-section.

The deflection of the particle, as it travels across the exhaust stream, can be determined in one of several ways. On one hand, the entire path or trajectory of the particle in the stream can be observed and recorded. A number of the materials previously referred to as being suitable for use as particles, such as aluminum and magnesium, become incandescent in the exhaust stream of hot gases from a jet engine or the like, thereby facilitating optical observation and recording of the particle's trajectory by photographic or television cameras.

FIG. 7 shows an optical system for observing and recording the trajectory of a particle fired from a nozzle, designated 70, but which may be the nozzle 12, 32 or 55 of any one of the previously described particle injecting means. For the purpose of clarity in illustration, the showing of means for measuring the particle entrance velocity is omitted in this view. The image of the test area of the stream is projected by an optical lens system, designated 71, onto the receiving face of a photo-electric scanning tube 72. The scanning tube may be of the type referred to commercially as "Vidicon," manufactured by the General Electric Company and Westinghouse. The output of the tube is amplified by an amplifier 73, and is then fed to a display device 74, such as a cathode ray tube, on which the glowing trace of the particle trajectory will appear. The trajectory image appearing on the display device may be permanently recorded in any conventional way, for example, by photographic means or the like. Alternatively, a motion picture or still camera can be positioned adjacent the test area of the exhaust stream to make a direct film record of the trajectory of the sampling particle.

When using either television or photographic cameras, it will usually be necessary to employ appropriate selective optical filters to decrease the extraneous "noise" generated by the exhaust flames.

Figure 8:
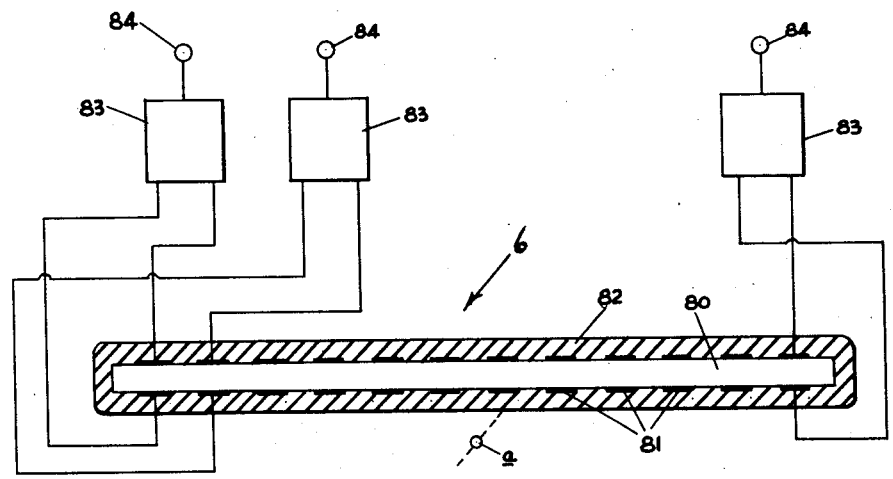
FIG. 8 shows an impact-responsive target for indicating the degree of deflection of an injected particle.

It is preferred to measure the degree of deflection by providing an impact-responsive recording target for the injected particles as they emerge from the exhaust stream. As shown in FIG. 8, the impact-responsive target comprises a piezo-electric crystal 80 provided with a series of uniformly or equally spaced electrodes or sensing stations 81, twelve (12) of such stations being shown. A station comprises a pair of electrodes, one on each side of the crystal. To provide protection against the hot exhaust gases, the crystal and the spaced electrodes thereon are coated with a heat-resistant material, such as suitable ceramic 82. Upon being struck by a particle leaving the exhaust stream, the area of impact closest to a particular sensing station provides a pulse to one of a series of amplifiers 83, there being one amplifier for each pair of electrodes constituting a sensing station. To indicate the position of impact of a particle with the target, a series of indicators, such as lights 84, are each connected to the respective amplifiers. For the purpose of clarity in illustration, only three amplifiers and their corresponding indicators are shown. Another means for indicating the position of particle impact which may be used is a telemetering system having a number of channels corresponding to the number of sensing stations, the channels being used to transmit signals to indicate the position of particle impact.

Figure 9:
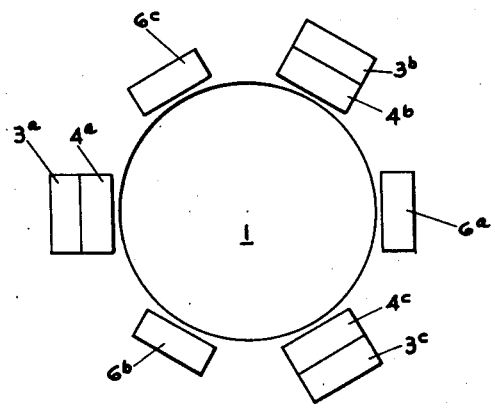
FIG. 9 is a diagrammatic showing of a plurality of particle injection means and corresponding deflection indicating means arranged at different points about the periphery of the exhaust stream.

To furnish a more complete analysis of the thrust pattern of the exhaust stream, a plurality of injection and velocity measuring stations, together with corresponding means for measuring particle deflection, are positioned at different points about the periphery of the stream. Thus, as shown in FIG. 9, three such injection and velocity measuring stations, 3a, 4a; 3b, 4b; and 3c, 4c, are positioned at 120° intervals around the exhaust stream, and three corresponding deflection measuring stations 6a, 6b, and 6c are provided. Also, the described particle injecting means, velocity measuring means and deflection measuring means are preferably duplicated in spaced series lengthwise of the exhaust stream.

From the foregoing description, it will be seen that the present invention affords a greatly simplified and accurate technique for measuring thrust characteristics in the hostile exhaust stream environment of reaction type engines, such as jet or rocket engines. The described method and apparatus enables the accurate measurement of the velocity of the exhaust stream. Measurement by the procedure of the invention does not disturb the exhaust stream's normal flow and dynamic behavior. Detecting and ascertaining the trajectory of the extraneous particles which are injected into the exhaust stream at various points within the cross-section of the stream, furnishes the stream's flow pattern and the highly significant position of the resultant thrust vector. With a given or known cross-sectional area of exhaust stream, and with the velocity of the exhaust stream determined or computed from the observed trajectory of the extraneous particles introduced into the stream as aforesaid, the total thrust and degree of efficiency of the reaction type engine is readily computed.

Although illustrative examples of several preferred embodiments of the invention have been described, it will be understood that the novel concept of the invention may be employed in various other forms. The particular type of particle material, injecting means, and the velocity and deflection measuring means can all be varied to suit the exigencies of the particular application. Although the particle mass is preferably predetermined, suitable instrumentation may be provided to measure the mass of each particle just prior to firing into the exhaust stream. The means for measuring the velocity of the particle may be omitted if the firing mechanism is constructed to provide sufficient uniformity and accuracy to maintain the firing velocity within acceptable limits. These, and other modifications will be apparent to those skilled in the art without departing from the spirit and scope of the invention as sought to be defined in the claims.

I claim:

1. A method for determining the thrust characteristics of a rapidly moving stream of high temperature gases comprising injecting a solid particle of predetermined and known mass into the stream at a known velocity sufficiently great for it to traverse the stream though deflected thereby, the solid particle being substantially greater in mass than the individual molecules of the stream of gases into which the particle is injected, measuring the velocity at which the particle enters the stream, and measuring the deflection of the particle caused by incremental thrusts exerted on said particle by the gases as the particle traverses the stream.

2. A method for determining the thrust characteristics of a rapidly moving stream of high temperature gases comprising injecting a solid particle of predetermined and known mass and predetermined and known velocity into the stream in a direction substantially transversely of the stream, the solid particle being substantially greater in mass than the individual molecules of the stream of gases into which the particle is injected, the velocity of the particle upon entry into the stream being sufficiently great to cause the particle to traverse the stream though deflected thereby, and measuring the deflection of the particle caused by incremental thrusts exerted on said particle by the gases as the particle traverses the stream.

3. A method for determining the thrust characteristics of a rapidly moving stream of high temperature gases comprising injecting a solid particle of predetermined and known mass into the stream in a direction substantially transversely of the stream, the solid particle being substantially greater in mass than the individual molecules of the stream of gases into which the particle is injected, the velocity of the particle upon entry into the stream being sufficiently great to cause the particle to pass through the stream though deflected thereby, measuring the velocity at which the particle enters the stream, and measuring the deflection of the particle caused by incremental thrusts exerted on said particle by the gases as the particle traverses the stream.

4. A method as set forth in claim 3, wherein said particle is a material selected from the group consisting of titanium, palladium, tellurium, osmium, iron, aluminum, and magnesium.

5. A method as set forth in claim 3, wherein the deflection of the particle is measured by an impact-responsive sensing means positioned for engagement by the particle after the particle has been deflected by the stream.

6. A method for determining the position of the resultant thrust vector of a reaction type engine having an exhaust nozzle emitting a rapidly moving stream of high temperature gases, said method comprising injecting, at each of a plurality of points about the periphery of the stream, a particle of predetermined and known mass into the stream in a direction substantially transversely of the stream, the velocity of the particle upon entry into the stream being sufficiently great to cause the particle to pass through the stream though deflected thereby, measuring the velocity at which each particle enters the stream, and measuring the deflection of each particle caused by the stream.

7. A method as set forth in claim 6, wherein the deflection of the particle is measured by an impact-responsive sensing means positioned for engagement by the particle after the particle has been deflected by the stream.

8. A method as set forth in claim 6, wherein the deflection of the particle is measured by recording its trajectory in the stream.

9. Apparatus for measuring the thrust characteristics of a rapidly moving stream of high temperature gases comprising solid particle supply means, firing and accelerating means located with respect to the stream for injecting a solid particle of predetermined and known mass into the stream substantially transversely of the stream, the solid particle being substantially greater in mass than the individual molecules of the stream of gases into which the particle is injected, means for controlling the feeding of the particles from the supply means to the firing and accelerating means, means for measuring the velocity at which said particle enters the stream, and means for measuring the deflection of the particle caused by incremental thrusts exerted on said particle by the gases as the particle traverses the stream.

10. Apparatus as set forth in claim 9, wherein the particle supply means comprises a continuous, flexible strip having particles separably connected thereto at uniformly spaced intervals.

11. Apparatus as set forth in claim 9, wherein the firing and accelerating means comprises a gas propellant and means for controllably actuating same.

12. Apparatus as set forth in claim 9, wherein the particle supply means comprises a continuous, flexible strip having particles separably connected thereto at uniformly spaced intervals, and means for controlling the feeding of the strip in timed relation to the actuation of the firing and accelerating means.

13. Apparatus as set forth in claim 9, wherein the means for measuring deflection comprises means, including a visual display device, for recording the trajectory of an injected particle.

14. Apparatus as set forth in claim 9, wherein the means for measuring deflection comprises impact-responsive sensing means positioned adjacent the stream for indicating the location of engagement with the sensing means of an emerging particle.

15. Apparatus for determining the position of the resultant thrust vector of a reaction type engine having an exhaust nozzle emitting a rapidly moving stream of high temperature gases, said apparatus comprising a plurality of particle injecting means positioned in spaced relationship about the periphery of the stream for injecting respective particles of predetermined and known mass and predetermined and known velocity into the stream substantially transversely of the stream, and means for measuring the deflection of each particle caused by the stream.

16. Apparatus for determining the position of the resultant thrust vector of a reaction type engine having an exhaust nozzle emitting a rapidly moving stream of high temperature gases, said apparatus comprising a plurality of particle injecting means positioned in spaced relationship about the periphery of the stream for injecting respective particles of predetermined and known mass into the stream substantially transversely of the stream, means for measuring the velocity at which each particle enters the stream, and means for measuring the deflection of each particle caused by the stream.

17. Apparatus as set forth in claim 16, wherein each of the particle injecting means comprises particle supply means and particle firing and accelerating means, and wherein means is provided for controlling the feeding of the particles from the supply means to the firing and accelerating means.

18. Apparatus as set forth in claim 16, wherein each of the particle injecting means comprises particle supply means and particle firing and accelerating means, said supply means comprising a continuous, flexible strip having particles separably connected thereto by zones of weakness at uniformly spaced intervals, and means for controlling the feeding of the strip in timed relation to the actuation of the firing and accelerating means.

19. Apparatus as set forth in claim 16, wherein the means for measuring deflection comprises means, including a visual display device, for recording the trajectory of an injected particle.

20. Apparatus as set forth in claim 16, wherein the means for measuring deflection comprises impact-responsive sensing means positioned adjacent the exhaust stream for indicating the location of engagement with the sensing means of an emerging particle.

References Cited in the file of this patent

UNITED STATES PATENTS

| | | |
|---|---|---|
| 2,514,235 | Genin et al. | July 4, 1950 |
| 2,627,543 | Obermaier | Feb. 3, 1953 |
| 2,637,208 | Mellen | May 5, 1953 |
| 3,019,073 | Hall | Jan. 30, 1962 |